United States Patent
Zhu

(10) Patent No.: US 8,859,708 B2
(45) Date of Patent: *Oct. 14, 2014

(54) SILICONE RESINS, SILICONE COMPOSITION, AND COATED SUBSTRATES

(75) Inventor: Bizhong Zhu, Midland, MI (US)

(73) Assignee: Dow Corning Corporation, Midland, MI (US)

(*) Notice: Subject to any disclaimer, the term of this patent is extended or adjusted under 35 U.S.C. 154(b) by 736 days.

This patent is subject to a terminal disclaimer.

(21) Appl. No.: 12/303,745

(22) PCT Filed: Jun. 13, 2007

(86) PCT No.: PCT/US2007/013847
§ 371 (c)(1),
(2), (4) Date: Dec. 8, 2008

(87) PCT Pub. No.: WO2008/013612
PCT Pub. Date: Jan. 31, 2008

(65) Prior Publication Data
US 2010/0227140 A1    Sep. 9, 2010

Related U.S. Application Data

(60) Provisional application No. 60/833,647, filed on Jul. 27, 2006.

(51) Int. Cl.
*C08G 77/16* (2006.01)
*C08G 77/48* (2006.01)
*C09D 183/14* (2006.01)

(52) U.S. Cl.
CPC ............. *C08G 77/48* (2013.01); *C09D 183/14* (2013.01)
USPC ........................................................... 528/10

(58) Field of Classification Search
USPC ............................................................ 528/10
See application file for complete search history.

(56) References Cited

U.S. PATENT DOCUMENTS

| | | | |
|---|---|---|---|
| 736,971 A | 8/1903 | Jenkins | |
| 2,601,337 A * | 6/1952 | Smith-Johannsen | 428/300.7 |
| 4,618,666 A * | 10/1986 | Porte | 528/33 |
| 4,761,454 A | 8/1988 | Oba et al. | |
| 5,312,946 A | 5/1994 | Stank et al. | |
| 5,371,139 A | 12/1994 | Yokoyama et al. | |
| 5,391,227 A * | 2/1995 | Stank et al. | 106/287.13 |
| 5,801,262 A | 9/1998 | Adams | |
| 6,376,078 B1 | 4/2002 | Inokuchi | |
| 2010/0273972 A1* | 10/2010 | Zhu | 528/29 |

FOREIGN PATENT DOCUMENTS

| | | |
|---|---|---|
| DE | 4033157 A1 | 9/1993 |
| DE | 4033157 | 9/2003 |
| EP | 0566311 A2 | 10/1993 |
| WO | WO 03/099828 | 12/2003 |

OTHER PUBLICATIONS

JP 59-096122, Publication Date Jun. 2, 1984, Patentee Toray Silicone Co. Ltd.
Reese, Herschel, "Development of Silicone Substrates to be Used with CIGS Deposition", AFOSR/NL Report, Feb. 1, 2005, Arlington, Virginia.
English Translation of DE 4033157A1; publication date Sep. 9, 1993.

* cited by examiner

*Primary Examiner* — Kuo-Liang Peng
(74) *Attorney, Agent, or Firm* — Howard & Howard Attorneys PLLC

(57) ABSTRACT

Silicone resins containing disilyloxane units, a silicone composition containing a silicone resin, and a coated substrate comprising a cured product or an oxidized product of a silicone resin.

20 Claims, No Drawings

SILICONE RESINS, SILICONE COMPOSITION, AND COATED SUBSTRATES

CROSS REFERENCE TO RELATED APPLICATIONS

This application is a U.S. national stage filing under 35U.S.C. §371 of PCT Application No. PCT/US07/013847 filed on 13 Jun. 2007, currently pending, which claims the benefit of U.S. Provisional Patent Application No. 60/833647 filed 27 Jul. 2006 under 35U.S.C. §119(e). PCT Application No. PCT/US07/013847 and U.S. Provisional Patent Application No. 60/833647 are hereby incorporated by reference.

FIELD OF THE INVENTION

The present invention relates to silicone resins and more particularly to silicone resins containing disilyloxane units. The present invention also relates to a silicone composition containing a silicone resin, and to a coated substrate comprising a cured product or an oxidized product of a silicone resin.

BACKGROUND OF THE INVENTION

Silicone materials prepared from disilanes are known in the art. For example, U.S. Pat. No. 736,971 to Chassot discloses a process for the production of an organosilicon resin containing both —Si—Si— and —Si—O—Si— linkages in its molecule, which comprises subjecting to hydrolysis and simultaneous condensation an organopolysilane of the formula $(CH_3)_m Si_n X_p$, where X represents a hydrolysable radical, n is a whole number greater than 1, and m, p, and n are related by the equation m+p=2n+2.

U.S. Pat. No. 4,618,666 to Porte discloses organosilicon resins comprising recurring disilane units, which resins are prepared by a process which includes cohydrolysis and condensation, in a heterogeneous solvent medium, of a mixture of organochlorosilanes and organochlorodisilanes.

Derwent World Patent Index Abstract of German Patent Publication No. DE 4,033,157 A to Albrecht et al. discloses production of soluble methylalkyloxypoly (disilyl)siloxanes, which comprises the single step alkoxylation and hydrolysis of disilane-containing distillation residue (A) from methylchlorosilane synthesis, or of the isolated disilanes, (A'). (A) or (A'), is reacted at reflux with a hydrolysis medium consisting of concentrated HCl (which provides an amount of water equimolar to the Si—Cl content in the starting material) and lower alkanol in presence of an inert organic solvent not miscible with the medium. The weight ratio of (A) or (A'), to alcohol is 1:0.5 to 1:4, and that of (A) or (A') to solvent is 1:9 to 1:0.2.

Although the aforementioned references disclose silicone materials prepared from disilane precursors, there remains a need for silicone resins that are curable, substantially free of gel, and highly soluble in organic solvents.

SUMMARY OF THE INVENTION

The present invention is directed to a silicone resin having the formula:

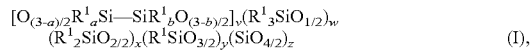

wherein each $R^1$ is independently —H, hydrocarbyl, or substituted hydrocarbyl; a is 0, 1, or 2; b is 0, 1, 2 or 3; $0.01 \leq v < 0.3$, w is from 0 to 0.8; x is from 0 to 0.99; y is from 0 to 0.99; z is from 0 to 0.99; and v+w+x+y+z=1.

The present invention is also directed to a silicone resin having the formula

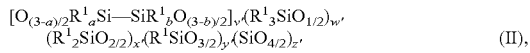

wherein each $R^1$ is independently —H, hydrocarbyl, or substituted hydrocarbyl; a is 0, 1, or 2; b is 0, 1, 2 or 3; $0.7 < v' \leq 1.0$, w' is from 0 to 0.3; x' is from 0 to 0.3; y' is from 0 to 0.3; z' is from 0 to 0.3; and v'+w'+x'+y'+z'=1.

The present invention is also directed to a silicone composition comprising a silicone resin selected from the aforementioned silicone resins, and an organic solvent.

The present invention is further directed to a coated substrate comprising a substrate and a coating on the substrate, wherein the coating is a cured product or an oxidized product of a silicone resin selected from at least one silicone resin having the formula (I), at least one silicone resin having the formula (II), and a mixture comprising the preceding resins.

The silicone resins of the present invention are soluble in a variety of organic solvents and are substantially free of gel. Moreover, the silicone resins can be cured to produce coatings exhibiting good adhesion to a variety of substrates.

The silicone composition of the present invention can be conveniently formulated as a one-part composition having good shelf-stability. Moreover, the composition can be applied to a substrate by conventional high-speed methods such as spin coating, printing, spraying, graveur coating, and slot die coating.

The coating of the coated substrate exhibits very low surface roughness, high resistance to thermally induced cracking, and low tensile strength.

The coated substrate of the present invention is useful in applications requiring substrates having high thermal stability and resistance to cracking. For example, the coated substrate can be used as a support for, or as an integral component of numerous electronic devices, including semiconductor devices, liquid crystals, light-emitting diodes, organic light-emitting diodes, optoelectronic devices, optical devices, photovoltaic cells, thin film batteries, and solar cells.

DETAILED DESCRIPTION OF THE INVENTION

As used herein, the term "disilyloxane unit" refers to an organosilicon unit having the formula $O_{(3-a)/2}R^1{}_a Si-SiR^1{}_b O_{(3-b)/2}$, where $R^1$, a, and b are defined below.

A first silicone resin according to the present invention has the formula:

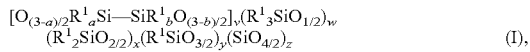

wherein each $R^1$ is independently —H, hydrocarbyl, or substituted hydrocarbyl; a is 0, 1, or 2; b is 0, 1, 2 or 3; $0.01 \leq v < 0.3$, w is from 0 to 0.8; x is from 0 to 0.99; y is from 0 to 0.99; z is from 0 to 0.99; and v+w+x+y+z=1.

The hydrocarbyl groups represented by $R^1$ typically have from 1 to 10 carbon atoms, alternatively from 1 to 6 carbon atoms, alternatively from 1 to 4 carbon atoms. Acyclic hydrocarbyl groups containing at least three carbon atoms can have a branched or unbranched structure. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and napthyl; alkaryl, such as tolyl and xylyl; arakyl, such as benzyl and phenethyl;

alkenyl, such as vinyl, allyl, and propenyl; aralkenyl, such as styryl and cinnamyl; and alkynyl, such as ethynyl and propynyl.

The substituted hydrocarbyl groups represented by $R^1$ can contain one or more of the same or different substituents, provided the substituent does not prevent formation of the alcoholysis product, the hydrolyzate, or the silicone resin. Examples of substituents include, but are not limited to, —F, —Cl, —Br, —I, —OH, —OR$^3$, —OCH$_2$CH$_2$OR$^4$, —CO$_2$R$^4$, —OC(=O)R$^3$, —C(=O)NR$^4{}_2$, wherein $R^3$ is $C_1$ to $C_8$ hydrocarbyl and $R^4$ is $R^3$ or —H.

The hydrocarbyl groups represented by $R^3$ typically have from 1 to 8 carbon atoms, alternatively from 3 to 6 carbon atoms. Acyclic hydrocarbyl groups containing at least 3 carbon atoms can have a branched or unbranched structure. Examples of hydrocarbyl include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; aryalkenyl, such as styryl; and alkynyl, such as ethynyl and propynyl.

In the formula (I) of the first silicone resin, the subscripts v, w, x, y, and z are mole fractions. The subscript v typically has a value of from 0.01 to less than 0.3, alternatively from 0.1 to 0.25, alternatively from 0.15 to 0.2; the subscript w typically has a value of from 0 to 0.8, alternatively from 0.1 to 0.6, alternatively from 0.12 to 0.2; the subscript x typically has a value of from 0 to 0.99, alternatively from 0 to 0.5, alternatively from 0.05 to 0.1; the subscript y typically has a value of from 0 to 0.99, alternatively from 0.1 to 0.8, alternatively from 0.4 to 0.6; and the subscript z typically has a value of from 0 to 0.99, alternatively from 0 to 0.6, alternatively from 0.3 to 0.5.

The first silicone resin typically has a number-average molecular weight of from 200 to 500,000, alternatively from 500 to 150,000, alternatively from 1,000 to 75,000, alternatively from 2,000 to 12,000, wherein the molecular weight is determined by gel permeation chromatography using a refractive index detector and polystyrene standards.

The first silicone resin typically contains from 1 to 50% (w/w), alternatively from 5 to 50% (w/w), alternatively from 5 to 35% (w/w), alternatively from 10% to 35% (w/w), alternatively from 10 to 20% (w/w), of silicon-bonded hydroxy groups based on the total weight of the resin, as determined by $^{29}$Si NMR.

Examples of silicone resins having the formula (I) include, but are not limited to, resins having the following formulae: (O$_{2/2}$MeSiSiO$_{3/2}$)$_{0.1}$(PhSiO$_{3/2}$)$_{0.9}$, (O$_{2/2}$MeSiSiMeO$_{2/2}$)$_{0.2}$ (Me$_2$SiO$_{2/2}$)$_{0.1}$(PhSiO$_{3/2}$)$_{0.7}$, (O$_{2/2}$MeSiSiO$_{3/2}$)$_{0.1}$(O$_{2/2}$MeSiSiMeO$_{2/2}$)$_{0.15}$(Me$_2$SiO$_{2/2}$)$_{0.1}$(MeSiO$_{3/2}$)$_{0.65}$, (O$_{1/2}$Me$_2$SiSiO$_{3/2}$)$_{0.25}$(SiO$_{4/2}$)$_{0.5}$(MePhSiO$_{2/2}$)$_{0.25}$, and (O$_{2/2}$EtSiSiEt$_2$O$_{1/2}$)$_{0.1}$(O$_{2/2}$MeSiSiO$_{3/2}$)$_{0.15}$(Me$_3$SiO$_{1/2}$)$_{0.05}$(PhSiO$_{3/2}$)$_{0.5}$(SiO$_{4/2}$)$_{0.2}$, where Me is methyl, Et is ethyl, Ph is phenyl, and the numerical subscripts outside the parenthesis denote mole fractions. Also, in the preceding formulae, the sequence of units is unspecified.

The first silicone resin can be prepared by (i) reacting at least one halodisilane having the formula $Z_{3-a}R^1{}_a$Si—SiR$^1{}_bZ_{3-b}$ and at least one halosilane having the formula $R^1{}_b$SiZ$_{4-b}$ with at least one alcohol having the formula $R^2$OH in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, b=0, 1, 2 or 3, and the mole ratio of the halosilane to the disilane is from 2.3 to 99; (ii) reacting the alcoholysis product with water at a temperature of from 0 to 40° C. to produce a hydrolyzate; and (iii) heating the hydrolyzate to produce the resin.

In step (i) of the method of preparing the first silicone resin at least one halodisilane having the formula $Z_{3-a}R^1{}_a$Si—SiR$^1{}_bZ_{3-b}$ and at least one halosilane having the formula $R^1{}_b$SiZ$_{4-b}$ are reacted with at least one alcohol having the formula $R^2$OH in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, b=0, 1, 2 or 3, and the mole ratio of the halosilane to the disilane is from 2.3 to 99. As used herein, the term "alcoholysis product" refers to a product formed by replacement of the silicon-bonded halogen atoms in the halodisilane and the halosilane with the group —OR$^2$, wherein $R^2$ is as described and exemplified below.

The halodisilane is at least one halodisilane having the formula $Z_{3-a}R^1{}_a$Si—SiR$^1{}_bZ_{3-b}$, wherein $R^1$, a, and b are as described and exemplified above for the first silicone resin, and Z is halo. Examples of halo atoms represented by Z include —F, —Cl, —Br, and —I.

Examples of halodisilanes include, but are not limited to, disilanes having the formulae: Cl$_2$MeSiSiMeCl$_2$, Cl$_2$MeSiSiMe$_2$Cl, Cl$_3$SiSiMeCl$_2$, Cl$_2$EtSiSiEtCl$_2$, Cl$_2$EtSiSiEt$_2$Cl, Cl$_3$SiSiEtCl$_2$, Cl$_3$SiSiCl$_3$, Br$_2$MeSiSiMeBr$_2$, Br$_2$MeSiSiMe$_2$Br, Br$_3$SiSiMeBr$_2$, Br$_2$EtSiSiEtBr$_2$, Br$_2$EtSiSiEt$_2$Br, Br$_3$SiSiEtBr$_2$, Br$_3$SiSiBr$_3$, I$_2$MeSiSiMeI$_2$, I$_2$MeSiSiMe$_2$I, I$_3$SiSiMeI$_2$, I$_2$EtSiSiEtI$_2$, I$_2$EtSiSiEt$_2$I, I$_3$SiSiEtI$_2$, and I$_3$SiSiI$_3$, where Me is methyl and Et is ethyl.

The halodisilane can be a single halodisilane or a mixture comprising two or more different halodisilanes, each having the formula $Z_{3-a}R^1{}_a$Si—SiR$^1{}_bZ_{3-b}$, wherein $R^1$, Z, a, and b are as described and exemplified above.

Methods of preparing halodisilanes are well known in the art; many of these compounds are commercially available. Also, the halodisilane can be obtained from the residue having a boiling point greater than 70° C. produced in the Direct Process for making methylchlorosilanes, as taught in WO 03/099828. Fractional distillation of the Direct Process residue gives a methylchlorodisilane stream containing a mixture of chlorodisilanes.

The halosilane is at least one halosilane having the formula $R^1{}_b$SiZ$_{4-b}$, wherein $R^1$, Z, and b are as described and exemplified above.

Examples of halosilanes include, but are not limited to, silanes having the formulae: SiCl$_4$, SiBr$_4$, HSiCl$_3$, HSiBr$_3$, MeSiCl$_3$, EtSiCl$_3$, MeSiBr$_3$, EtSiBr$_3$, Me$_2$SiCl$_2$, Et$_2$SiCl$_2$, Me$_2$SiBr$_2$, Et$_2$SiBr$_2$, Me$_3$SiCl, Et$_3$SiCl, and Me$_3$SiBr, Et$_3$SiBr, where Me is methyl and Et is ethyl.

The halosilane can be a single halosilane or a mixture comprising two or more different halosilanes, each having the formula $R^1{}_b$SiZ$_{4-b}$, wherein $R^1$, Z, and b are as described and exemplified above. Further, methods of preparing halosilanes are well known in the art; many of these compounds are commercially available.

The alcohol is at least one alcohol having the formula $R^2$OH, wherein $R^2$ is alkyl or cycloalkyl. The structure of the alcohol can be linear or branched. Also, the hydroxy group in the alcohol may be attached to a primary, secondary or tertiary carbon atom.

The alkyl groups represented by $R^2$ typically have from 1 to 8 carbon atoms, alternatively from 1 to 6 carbon atoms, alternatively from 1 to 4 carbon atoms. Alkyl groups containing at least 3 carbon atoms can have a branched or unbranched structure. Examples of alkyl groups include, but are not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl.

The cycloalkyl groups represented by $R^2$ typically have from 3 to 12 carbon atoms, alternatively from 4 to 10 carbon atoms, alternatively from 5 to 8 carbon atoms. Examples of cycloalkyl groups include, but are not limited to, cyclopentyl, cyclohexyl, and methylcyclohexyl.

Examples of alcohols include, but are not limited to, methanol, ethanol, 1-propanol, 2-propanol, 1-butanol, 2-butanol, 2-methyl-1-butanol, 1,1-dimethyl-1-ethanol, pentanol, hexanol, cyclohexanol, heptanol, and octanol. The alcohol can be a single alcohol or a mixture comprising two or more different alcohols, each as described and exemplified above.

The organic solvent can be any aprotic or dipolar aprotic organic solvent that does not react with the halodisilane, the halosilane, or the first silicone resin product under the conditions of the present method, and is miscible with the halodisilane, the halosilane, and the first silicone resin. The organic solvent can be immiscible or miscible with water. As used herein, the term "immiscible" means that the solubility of water in the solvent is less than about 0.1 g/100 g of solvent at 25° C. The organic solvent can also be the alcohol having the formula $R^2OH$, wherein $R^2$ is as described and exemplified above, that is reacted with the halodisilane and, optionally, the halosilane.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; halogenated aromatic hydrocarbons such as bromobenzene and chlorobenzene; and alcohols such as methanol, ethanol, 1-propanol, 2-propanol, 1-butanol, 2-butanol, 2-methyl-1-butanol, 1,1-dimethyl-1-ethanol, pentanol, hexanol, cyclohexanol, hepatanol, and octanol.

The organic solvent can be a single organic solvent or a mixture comprising two or more different organic solvents, each as described and exemplified above.

The reaction of the halodisilane and the halosilane with the alcohol to produce the alcoholysis product can be carried out in any standard reactor suitable for contacting, for example, halosilanes with alcohol. Suitable reactors include glass and Teflon-lined glass reactors. Preferably, the reactor is equipped with a means of agitation, such as stirring.

The halodisilane, halosilane, alcohol, and organic solvent can be combined in any order. Typically, the halodisilane and the halosilane are combined with the alcohol in the presence of the organic solvent by adding the alcohol to a mixture of the halodisilane, halosilane, and organic solvent. Reverse addition, i.e., addition of the silane(s) to the alcohol is also possible. The hydrogen halide gas (e.g., HCl) produced as a by-product in the reaction is typically allowed to pass from the reaction vessel into an acid neutralization trap.

The rate of addition of the alcohol to the halodisilane and the halosilane is typically from 5 mL/min. to 50 mL/min. for a 1000-mL reaction vessel equipped with an efficient means of stirring. When the rate of addition is too slow, the reaction time is unnecessarily prolonged. When the rate of addition is too fast, the violent evolution of hydrogen halide gas may be hazardous.

The reaction of the halodisilane and the halosilane with the alcohol is typically carried out at room temperature (~23±2° C.). However, the reaction can be carried out at lower or higher temperatures. For example, the reaction can be carried out at a temperature of from 10° C. to 60° C.

The reaction time depends on several factors, including the structures of the halodisilane and the halosilane, and the temperature. The reaction is typically carried out for an amount of time sufficient to complete alcoholysis of the halodisilane and the halosilane. As used herein, the term "to complete alcoholysis" means that at least 85 mol % of the silicon-bonded halogen atoms originally present in the halodisilane and the halosilane combined are replaced with the groups —$OR^2$. For example, the reaction time is typically from 5 to 180 min., alternatively from 10 to 60 min., alternatively from 15 to 25 min., at a temperature of from 10 to 60° C. The optimum reaction time can be determined by routine experimentation using the methods set forth in the Examples section below.

The concentration of the halodisilane in the reaction mixture is typically from 5 to 80% (w/w), alternatively from 20 to 70% (w/w), alternatively from 30 to 60% (w/w), based on the total weight of the reaction mixture.

The mole ratio of the halosilane to the halodisilane is typically from 2.3 to 99, alternatively from 2.4 to 9, alternatively from 2.5 to 6, alternatively from 3 to 5.

The mole ratio of the alcohol to the silicon-bonded halogen atoms in the halodisilane and the halosilane combined is typically from 0.5 to 10, alternatively from 1 to 5, alternatively from 1 to 2.

The concentration of the organic solvent is typically from 0 to 95% (w/w), alternatively from 5 to 88% (w/w), alternatively from 30 to 82% (w/w), based on the total weight of the reaction mixture.

In step (ii) of the method of preparing the first silicone resin, the alcoholysis product is reacted with water at a temperature of from 0 to 40° C. to produce a hydrolyzate.

The alcoholysis product is typically combined with water by adding the alcoholysis product to the water. Reverse addition, i.e., addition of water to the alcoholysis product is also possible. However, reverse addition may result in formation of predominately gels.

The rate of addition of the alcoholysis product to water is typically from 2 mL/min. to 100 mL/min. for a 1000-mL reaction vessel equipped with an efficient means of stirring. When the rate of addition is too slow, the reaction time is unnecessarily prolonged. When the rate of addition is too fast, the reaction mixture may form a gel.

The reaction of step (ii) is typically carried out at a temperature of from 0 to 40° C., alternatively from 0 to 20° C., alternatively from 0 to 5° C. When the temperature is less than 0° C., the rate of the reaction is typically very slow. When the temperature is greater than 40° C., the reaction mixture may form a gel.

The reaction time depends on several factors, including the structure of the alcoholysis product and the temperature. The reaction is typically carried out for an amount of time sufficient to complete hydrolysis of the alcoholysis product. As used herein, the term "to complete hydrolysis" means that at least 85 mol % of the silicon-bonded groups —$OR^2$ originally present in the alcoholysis product are replaced with hydroxy groups. For example, the reaction time is typically from 0.5 min. to 5 h, alternatively from 1 min. to 3 h, alternatively from 5 min. to 1 h at a temperature of from 0 to 40° C. The optimum reaction time can be determined by routine experimentation using the methods set forth in the Examples section below.

The concentration of water in the reaction mixture is typically sufficient to effect hydrolysis of the alcoholysis product. For example, the concentration of water is typically from 1 mole to 50 moles, alternatively from 5 moles to 20 moles, alternatively from 8 moles to 15 moles, per mole of the silicon-bonded groups —$OR^2$ in the alcoholysis product.

In step (iii) of the method of preparing the first silicone resin, the hydrolyzate is heated to produce the silicone resin. The hydrolyzate is typically heated at a temperature of from 40 to 100° C., alternatively from 50 to 85° C., alternatively from 55 to 70° C. The hydrolyzate is typically heated for a period of time sufficient to produce a silicone resin having a number-average molecular weight of from 200 to 500,000. For example, the hydrolyzate is typically heated for a period of from 1 h to 2 h, at a temperature of from 55° C. to 70° C.

The method can further comprise recovering the first silicone resin. When the mixture of step (iii) contains a water-immiscible organic solvent, such as tetrahydrofuran, the silicone resin can be recovered from the reaction mixture by separating the organic phase containing the resin from the aqueous phase. The separation can be carried out by discontinuing agitation of the mixture, allowing the mixture to separate into two layers, and removing the aqueous or organic phase. The organic phase is typically washed with water. The water can further comprise a neutral inorganic salt, such as sodium chloride, to minimize formation of an emulsion between the water and organic phase during washing. The concentration of the neutral inorganic salt in the water can be up to saturation. The organic phase can be washed by mixing it with water, allowing the mixture to separate into two layers, and removing the aqueous layer. The organic phase is typically washed from 1 to 5 times with separate portions of water. The volume of water per wash is typically from 0.5 to 2 times the volume of the organic phase. The mixing can be carried out by conventional methods, such as stirring or shaking. The silicone resin can be used without further isolation or purification or the resin can be separated from most of the solvent by conventional methods of evaporation.

When the mixture of step (iii) contains a water-miscible organic solvent (e.g., methanol), the first silicone resin can be recovered from the reaction mixture by separating the resin from the aqueous solution. For example, the separation can be carried out by distilling the mixture at atmospheric or subatmospheric pressure. The distillation is typically carried out at a temperature of from 40 to 60° C., alternatively from 60 to 80° C., at a pressure of 0.5 kPa.

Alternatively, the first silicone resin can be separated from the aqueous solution by extracting the mixture containing the resin with a water immiscible organic solvent, such as methyl isobutyl ketone. The fist silicone resin can be used without further isolation or purification or the resin can be separated from most of the solvent by conventional methods of evaporation.

A second silicone resin according to the present invention has the formula

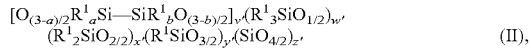

$$[O_{(3-a)/2}R^1{}_aSi—SiR^1{}_bO_{(3-b)/2}]_{v'}(R^1{}_3SiO_{1/2})_{w'}(R^1{}_2SiO_{2/2})_{x'}(R^1SiO_{3/2})_{y'}(SiO_{4/2})_{z'} \quad (II),$$

wherein each $R^1$ is independently —H, hydrocarbyl, or substituted hydrocarbyl; a is 0, 1, or 2; b is 0, 1, 2 or 3; $0.7 < v' \le 1.0$, w' is from 0 to 0.3; x' is from 0 to 0.3; y' is from 0 to 0.3; z' is from 0 to 0.3; and $v'+w'+x'+y'+z'=1$.

In the formula (II) of the second silicone resin, $R^1$, a, and b are as defined and exemplified above for the first silicone resin. Also, the subscripts v', w', x', y', and z' are mole fractions. The subscript v' typically has a value of from greater than 0.7 to 1.0, alternatively from 0.75 to 0.9, alternatively from 0.8 to 0.9; the subscript w' typically has a value of from 0 to 0.3, alternatively from 0 to 0.2, alternatively from 0 to 0.1; the subscript x' typically has a value of from 0 to 0.3, alternatively from 0 to 0.2, alternatively from 0 to 0.1; the subscript y' typically has a value of from 0 to 0.3, alternatively from 0 to 0.2, alternatively from 0 to 0.1; and the subscript z' typically has a value of from 0 to 0.3, alternatively from 0 to 0.2, alternatively from 0 to 0.1.

The second silicone resin typically has a number-average molecular weight of from 200 to 500,000, alternatively from 500 to 150,000, alternatively from 1,000 to 75,000, alternatively from 2,000 to 12,000, wherein the molecular weight is determined by gel permeation chromatography using a refractive index detector and polystyrene standards.

The second silicone resin typically contains from 1 to 50% (w/w), alternatively from 5 to 50% (w/w), alternatively from 5 to 35% (w/w), alternatively from 10% to 35% (w/w), alternatively from 10 to 20% (w/w), of silicon-bonded hydroxy groups based on the total weight of the resin, as determined by $^{29}Si$ NMR.

Examples of silicone resins having the formula (II) include, but are not limited to, resins having the following formulae: $(O_{3/2}SiSiMe_2O_{1/2})_{0.75}(PhSiO_{3/2})_{0.25}$, $(O_{3/2}SiSiMeO_{2/2})_{0.75}(SiO_{4/2})_{0.25}$, $(O_{2/2}MeSiSiMe_2O_{1/2})_{0.5}(O_{2/2}MeSiSiO_{3/2})_{0.3}(PhSiO_{3/2})_{0.2}$, $(O_{2/2}EtSiSiMeO_{2/2})_{0.8}(MeSiO_{3/2})_{0.05}(SiO_{4/2})_{0.15}$, $(O_{2/2}MeSiSiO_{3/2})_{0.8}(Me_3SiO_{1/2})_{0.05}(Me_2SiO_{2/2})_{0.1}(SiO_{4/2})_{0.5}$, $(O_{2/2}MeSiSiEtO_{2/2})_{0.25}(O_{3/2}SiSiMeO_{2/2})_{0.6}(MeSiO_{3/2})_{0.1}(SiO_{4/2})_{0.05}$, $(O_{1/2}Me_2SiSiMeO_{2/2})_{0.75}(O_{2/2}MeSiSiMeO_{2/2})_{0.25}$, $(O_{1/2}Et_2SiSiEtO_{2/2})_{0.5}(O_{2/2}EtSiSiEtO_{2/2})_{0.5}$, $(O_{1/2}Et_2SiSiEtO_{2/2})_{0.2}(O_{2/2}MeSiSiMeO_{2/2})_{0.8}$, $(O_{1/2}Me_2SiSiMeO_{2/2})_{0.6}(O_{2/2}EtSiSiEtO_{2/2})_{0.4}$, $(O_{3/2}SiSiO_{3/2})_m$, $(O_{3/2}SiSiMeO_{2/2})_m$, $(O_{3/2}SiSiMe_2O_{1/2})_m$, $(O_{3/2}SiSiMe_3)_m$, $(O_{2/2}MeSiSiMeO_{2/2})_m$, $(O_{2/2}MeSiSiMe_2O_{1/2})_m$, $(O_{2/2}MeSiSiMe_3)_m$, $(O_{1/2}Me_2SiSiMeO_{2/2})_m$, $(O_{3/2}SiSiEtO_{2/2})_m$, $(O_{3/2}SiSiEt_2O_{1/2})_m$, $(O_{3/2}SiSiEt_3)_m$, $(O_{2/2}EtSiSiEtO_{2/2})_m$, $(O_{2/2}EtSiSiEt_2O_{1/2})_m$, $(O_{2/2}EtSiSiEt_3)_m$, and $(O_{1/2}Et_2SiSiEtO_{2/2})_m$, where Me is methyl, Et is ethyl, Ph is phenyl, m has a value such that the resin has a number-average molecular weight of from 200 to 500,000, and the numerical subscripts outside the parenthesis denote mole fractions. Also, in the preceding formulae, the sequence of units is unspecified.

The second silicone resin can be prepared by (i) reacting at least one halodisilane having the formula $Z_{3-a}R^1{}_aSi—SiR^1{}_bZ_{3-b}$ and, optionally, at least one halosilane having the formula $R^1{}_bSiZ_{4-b}$ with at least one alcohol having the formula $R^2OH$ in the presence of an organic solvent to produce an alcoholysis product, wherein each $R^1$ is independently —H, hydrocarbyl, or substituted hydrocarbyl, $R^2$ is alkyl or cycloalkyl, Z is halo, a=0, 1, or 2, b=0, 1, 2 or 3, and the mole ratio of the halosilane to the disilane is from 0 to 0.43; (ii) reacting the alcoholysis product with water at a temperature of from 0 to 40° C. to produce a hydrolyzate; and (iii) heating the hydrolyzate to produce the resin.

In the method of preparing the second silicone resin, the halodisilane, halosilane, alcohol, and organic solvent are as described and exemplified above in the method of preparing the first silicone resin.

Moreover, the method of preparing the second silicone resin can be carried out in the manner described above for preparing the first silicone resin, except the mole ratio of the halosilane to the halodisilane is typically from 0 to 0.43, alternatively from 0.1 to 0.3, alternatively from 0.15 to 0.25.

Furthermore, the second silicone resin can be recovered from the reaction mixture as described above for the first silicone resin.

A silicone composition according to the present invention comprises:

(A) a silicone resin selected from (i) at least one silicone resin having the formula $[O_{(3-a)/2}R^1{}_aSi\text{—}SiR^1{}_bO_{(3-b)/2}]_v(R^1{}_3SiO_{1/2})_w(R^1{}_2SiO_{2/2})_x(R^1SiO_{3/2})_y(SiO_{4/2})_z$ (I), (ii) at least one silicone resin having the formula $[O_{(3-a)/2}R^1{}_aSi\text{—}SiR^1{}_bO_{(3-b)/2}]_{v'}(R^1{}_3SiO_{1/2})_{w'}(R^1{}_2SiO_{2/2})_{x'}(R^1SiO_{3/2})_{y'}(SiO_{4/2})_{z'}$ (II), and (iii) a mixture comprising (i) and (ii), wherein each $R^1$ is independently H, hydrocarbyl, or substituted hydrocarbyl; a is 0, 1, or 2; b is 0, 1, 2 or 3, $0.015 \le v < 0.3$, w is from 0 to 0.8, x is from 0 to 0.99, y is from 0 to 0.99, z is from 0 to 0.99, $v+w+x+y+z=1$, $0.7 < v' \le 1.0$, w' is from 0 to 0.3, x' is from 0 to 0.3, y' is from 0 to 0.3, z' is from 0 to 0.3, and $v'+w'+x'+y'+z'=1$; and (B) an organic solvent.

Components (A)(i) and (A)(ii) are the first silicone resin and the second silicone resin, respectively, described and exemplified above.

Component (B) of the silicone compositor is at least one organic solvent. The organic solvent can be any protic, aprotic, or dipolar aprotic organic solvent that does not react with the silicone resin or any optional ingredients (e.g., a crosslinking agent) and is miscible with the silicone resin.

Examples of organic solvents include, but are not limited to, alcohols, such as methanol, ethanol, 1-propanol, 2-propanol, 1-butanol, 2-butanol, 2-methyl-1-butanol, 1-pentanol, and cyclohexanol; saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as defined above.

The concentration of the organic solvent is typically from 5% to 99.5% by weight, alternatively from 40 to 95% by weight, alternatively from 60% to 90% by weight, based on the total weight of the silicone composition.

The silicone composition can comprise additional ingredients, provided the ingredient does not prevent the silicone resin from forming a cured product or an oxidized product, as described below. Examples of additional ingredients include, but are not limited to, adhesion promoters; dyes; pigments; anti-oxidants; heat stabilizers; UV stabilizers, flame retardants, flow control additives, cross-linking agents, and condensation catalysts.

The silicone composition can further comprises a cross-linking agent and/or a condensation catalyst. The cross-linking agent can have the formula $R^3{}_qSiX_{4-q}$, wherein $R^3$ is $C_1$ to $C_8$ hydrocarbyl, X is a hydrolysable group, and q is 0 or 1. The hydrocarbyl groups represented by $R^3$ are as described and exemplified above.

As used herein the term "hydrolysable group" means the silicon-bonded group reacts with water in the absence of a catalyst at any temperature from room temperature ($\sim 23 \pm 2^\circ$ C.) to $100^\circ$ C. within several minutes, for example thirty minutes, to form a silanol (Si—OH) group. Examples of hydrolysable groups represented by X include, but are not limited to, —Cl, —Br, —OR$^3$, —OCH$_2$CH$_2$OR$^4$, CH$_3$C(=O)O—, Et(Me)C=N—O—, CH$_3$C(=O)N(CH$_3$)—, and —ONH$_2$, wherein $R^3$ and $R^4$ are as described and exemplified above.

Examples of cross-linking agents include, but are not limited to, alkoxy silanes such as MeSi(OCH$_3$)$_3$, CH$_3$Si(OCH$_2$CH$_3$)$_3$, CH$_3$Si(OCH$_2$CH$_2$CH$_3$)$_3$, CH$_3$Si[O(CH$_2$)$_3$CH$_3$]$_3$, CH$_3$CH$_2$Si(OCH$_2$CH$_3$)$_3$, C$_6$H$_5$Si(OCH$_3$)$_3$, C$_6$H$_5$CH$_2$Si(OCH$_3$)$_3$, C$_6$H$_5$Si(OCH$_2$CH$_3$)$_3$, CH$_2$=CHSi(OCH$_3$)$_3$, CH$_2$=CHCH$_2$Si(OCH$_3$)$_3$, CF$_3$CH$_2$CH$_2$Si(OCH$_3$)$_3$, CH$_3$Si(OCH$_2$CH$_2$OCH$_3$)$_3$, CF$_3$CH$_2$CH$_2$Si(OCH$_2$CH$_2$OCH$_3$)$_3$, CH$_2$=CHSi(OCH$_2$CH$_2$OCH$_3$)$_3$, CH$_2$=CHCH$_2$Si(OCH$_2$CH$_2$OCH$_3$)$_3$, C$_6$H$_5$Si(OCH$_2$CH$_2$OCH$_3$)$_3$, Si(OCH$_3$)$_4$, Si(OC$_2$H$_5$)$_4$, and Si(OC$_3$H$_7$)$_4$; organoacetoxysilanes such as CH$_3$Si(OCOCH$_3$)$_3$, CH$_3$CH$_2$Si(OCOCH$_3$)$_3$, and CH$_2$=CHSi(OCOCH$_3$)$_3$; organoiminooxysilanes such as CH$_3$Si[O—N=C(CH$_3$)CH$_2$CH$_3$]$_3$, Si[O—N=C(CH$_3$)CH$_2$CH$_3$]$_4$, and CH$_2$=CHSi[O—N=C(CH$_3$)CH$_2$CH$_3$]$_3$; organoacetamidosilanes such as CH$_3$Si[NHC(=O)CH$_3$]$_3$ and C$_6$H$_5$Si[NHC(=O)CH$_3$]$_3$; amino silanes such as CH$_3$Si[NH(s—C$_4$H$_9$)]$_3$ and CH$_3$Si(NHC$_6$H$_{11}$)$_3$; and organoaminooxysilanes.

The cross-linking agent can be a single silane or a mixture of two or more different silanes, each as described above. Also, methods of preparing tri- and tetra-functional silanes are well known in the art; many of these silanes are commercially available.

When present, the concentration of the cross-linking agent in the silicone composition is sufficient to cure (cross-link) the silicone resin. The exact amount of the cross-linking agent depends on the desired extent of cure, which generally increases as the ratio of the number of moles of silicon-bonded hydrolysable groups in the cross-linking agent to the number of moles of silicon-bonded hydroxy groups in the silicone resin increases. Typically, the concentration of the cross-linking agent is sufficient to provide from 0.2 to 4 moles of silicon-bonded hydrolysable groups per mole of silicon-bonded hydroxy groups in the silicone resin. The optimum amount of the cross-linking agent can be readily determined by routine experimentation.

As stated above, the silicone composition can further comprise at least one condensation catalyst. The condensation catalyst can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst can be selected from tin(II) and tin(IV) compounds such as tin dilaurate, tin dioctoate, and tetrabutyl tin; and titanium compounds such as titanium tetrabutoxide.

The concentration of the condensation catalyst is typically from 0.1 to 10% (w/w), alternatively from 0.5 to 5% (w/w), alternatively from 1 to 3% (w/w), based on the total weight of the silicone resin.

When the silicone composition described above contains a condensation catalyst, the composition is typically a two-part composition where the silicone resin and condensation catalyst are in separate parts.

A coated substrate according to the present invention comprises:

a substrate; and coating on the substrate, wherein the coating is a cured product or an oxidized product of a silicone resin selected from (i) at least one silicone resin having the formula $[O_{(3-a)/2}R^1{}_aSi\text{—}SiR^1{}_bO_{(3-b)/2}]_v(R^1{}_3SiO_{1/2})_w(R^1{}_2SiO_{2/2})_x(R^1SiO_{3/2})_y(SiO_{4/2})_z$ (I), (ii) at least one silicone resin having the formula $[O_{(3-a)/2}R^1{}_aSi\text{—}$ $SiR^1{}_bO_{(3-b)/2}]_v(R^1{}_3SiO_{1/2})_{w'}(R^1{}_2SiO_{2/2})_{x'}(R^1SiO_{3/2})_{y'}$ $(SiO_{4/2})_{z'}$ (II), and (iii) a mixture comprising (i) and (ii), wherein each $R^1$ is independently —H, hydrocarbyl, or substituted hydrocarbyl; a is 0, 1, or 2; b is 0, 1, 2 or 3, $0.01 \leq v < 0.3$, w is from 0 to 0.8, x is from 0 to 0.9, y is from 0 to 0.99, z is from 0 to 0.99, $v+w+x+y+z=1$, $0.7 < v' \leq 1.0$, w' is from 0 to 0.3, x' is from 0 to 0.3, y' is from 0 to 0.3, z' is from 0 to 0.3, and $v'+w'+x'+y'+z'=1$.

The substrate can be any rigid or flexible material having a planar, complex, or irregular contour. The substrate can be transparent or nontransparent to light in the visible region (~400 to ~700 nm) of the electromagnetic spectrum. Also, the substrate can be an electrical conductor, semiconductor, or nonconductor. Examples of substrates include, but are not limited to, semiconductors such as silicon, silicon having a surface layer of silicon dioxide, silicon carbide, indium phosphide, and gallium arsenide; quartz; fused quartz; aluminum oxide; ceramics; glass; metal foils; polyolefins such as polyethylene, polypropylene, polystyrene, polyethylene terephthalate (PET), and polyethylene naphthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones.

The coating of the coated substrate typically has a thickness of from 0.010 μm to 20 μm, alternatively from 0.050 μm to 10 μm, alternatively from 0.100 μm to 5 μm. The coating levels the irregular surfaces of various substrates and has excellent thermal crack resistance as well as dielectric and adhesion properties.

The coated substrate, wherein the coating is a cured product of a silicone resin can be prepared by applying the silicone resin or a silicone composition, each as described above, on a substrate to form a film and curing the silicone resin of the film. The silicone resin or silicone composition can be applied to the substrate using conventional methods such as spin coating, dip coating, spray coating, flow coating, screen printing, and roll coating. When present, the solvent is typically allowed to evaporate from the coated substrate before the film is heated. Any suitable means for evaporation may be used such as simple air drying, applying a vacuum, or heating (up to 50° C.).

The silicone resin can be cured (i.e., crosslinked) by heating the film. For example, the silicone resin is typically cured by heating the film at a temperature of from 50 to 260° C., alternatively from 50 to 250° C., alternatively from 100 to 200° C. When the silicone composition comprises a condensation catalyst, the silicone resin can typically be cured at a lower temperature, e.g., from room temperature (~23 ±2° C.) to 200° C. The time of heating, which depends on the structure of the silicone resin, is typically from 1 to 50 h, alternatively from 1 to 10 h, alternatively from 1 to 5 h. The film can be heated using convention methods such as a quartz tube furnace, a convection oven, or radiant or microwave energy.

The coated substrate, wherein the coating is an oxidized product of a silicone resin, can be prepared by applying a silicone resin or a silicone composition, each as described above, on a substrate to form a film and oxidizing the silicone resin of the film.

The silicone resin or silicone composition can be applied on the substrate as described above. The silicone resin can be oxidized by heating the film, or exposing the film to UV radiation. For example, the silicone resin can be oxidized by heating the film in air at a temperature of from 300 to 600° C. The film is typically heated for a period of time such that the mass of the oxidized coating is from 1 to 3% (w/w) greater than the mass of the coating prepared by curing the silicone resin of the film. For example, the film is typically heated for a period of from 0.01 to 1 h, alternatively from 0.01 to 0.2 h. Alternatively, the silicone resin can be oxidized by curing the silicone resin of the film, as described above, and then heating the cured silicone resin at a temperature of from 300 to 600° C.

The silicone resins of the present invention are soluble in a variety of organic solvents. For example, the solubility of the silicone resins in an organic solvent, which depends on the structure, molecular weight, and content of silicon-bonded hydroxy groups, is typically at least 2 g/mL, alternatively at least 1 g/mL, at room temperature (~23±2° C.). In particular, the solubility of the silicone resins in methyl isobutyl ketone is typically from 0.1 to 2 g/mL, alternatively from 0.2 to 1 g/mL, at room temperature (~23 ±2° C.).

The silicone resins are also substantially free of gel as determined by visible light spectrometry. For example, a solution containing 16% (w/w) of the first or second silicone resin in an organic solvent typically has a percent transmittance of at least 60%, alternatively at least 80%, alternatively at least 90%, for light in the visible region (~400 to ~700 nm) of the electromagnetic spectrum, as measured using a cell having a path length of 2.54 cm.

The silicone composition of the present invention can be conveniently formulated as a one-part composition having good shelf-stability. Moreover, the composition can be applied to a substrate by conventional high-speed methods such as spin coating, printing, and spraying.

The coating of the coated substrate exhibits very low surface roughness, high resistance to thermally induced cracking, and low tensile strength.

The coated substrate of the present invention is useful in applications requiring substrates having high thermal stability and resistance to cracking. For example, the coated substrate can be used as a support for, or as an integral component of numerous electronic devices, including semiconductor devices, liquid crystals, light-emitting diodes, organic light-emitting diodes, optoelectronic devices, optical devices, photovoltaic cells, thin film batteries, and solar cells.

EXAMPLES

The following examples are presented to better illustrate the silicone resin, silicone composition, and coated substrate of the present invention, but are not to be considered as limiting the invention, which is delineated in the appended claims. Unless otherwise noted, all parts and percentages reported in the examples are by weight. The following methods and materials were employed in the examples:

Determination of Molecular Weights

Number-average and weight-average molecular weights ($M_n$ and $M_w$) of silicone resins were determined by gel permeation chromatography (GPC) using a PLgel (Polymer Laboratories, Inc.) 5-μm column at room temperature (~23° C.), a THF mobile phase at 1 mL/min, and a refractive index detector. Polystyrene standards were used for linear regression calibrations.

Disilane Composition A is a chlorodisilane stream obtained by fractional distillation of the residue produced in the direct process for manufacturing methylchlorosilanes. The composition contains $C_4H_9SiMeCl_2$, 7.1%, $Me_3Cl_3Si_2O$, 0.3%, $Me_4Cl_2Si_2$, 8.6%, $Me_2Cl_4Si_2O$, 1.9%, $C_{10}$ hydrocarbon, 1.9%, $Me_3Cl_3Si_2$, 25.8%, and $Me_2Cl_4Si_2$, 52.8%, based on total weight.

Disilane Composition B is a chlorodisilane stream obtained by fractional distillation of the residue produced in the direct process for manufacturing methylchlorosilanes.

The composition contains $Me_4Cl_2Si_2$, 0.1%, $Me_3Cl_3Si_2$, 30.9%, and $Me_2Cl_4Si_2$, 66.2%, based on total weight.

Example 1

Disilane Composition A (30 g), was mixed with 120 g of methyl isobutyl ketone and 38.4 g of anhydrous methanol. The HCl produced from the reaction was allowed to escape from the open mouth of the flask. The liquid mixture was placed in a sealed bottle, chilled in an ice water bath, and then transferred to an addition funnel mounted on top of a three necked round bottom flask equipped with a stirrer and a thermometer. Deionized water (120 g) was placed in the flask and cooled with an external ice water bath to 2 to 4° C. The mixture in the addition funnel was continuously added to the chilled deionized water over a period of 10 min., during which time the temperature of the mixture increased by 3 to 5° C. After completion of the addition, the mixture was stirred in the ice bath for 1 h. The flask was then heated to 50 to 75° C. with a water bath and held at that temperature for 1 h. The mixture was allowed to cool to room temperature and then washed with a solution of 10 g of NaCl in 200 mL of water, four times. After each wash the aqueous phase was discarded. The organic phase was isolated and concentrated at 60° C. and a pressure of 2.7 kPa to produce solutions containing 39.1% (w/w) and 47.5% (w/w) of the silicone resin in MIBK. The resin has a weight-average molecular weight of about 3500, a number-average molecular weight of about 1740, and contains about 8 mol % of silicon-bonded hydroxy groups.

Example 2

A silicone composition containing 16.0% of silicone resin in MIBK was prepared as described in Example 1, except Disilane Composition A was replaced with Disilane Composition B.

Example 3

The silicone composition of Example 1 containing 39.1% (w/w) of silicone resin, was spin coated (1000 rpm, 30 s) on a piece of stainless steel (thickness 0.001 in.). The coated steel was then heated from room temperature to 200° C. at a rate of 2° C./min., and held at 200° C. for 2 h. The oven was turned off and the coated substrate was allowed to cool to room temperature. The cured silicone resin coating had a thickness of 2.70 μm, a refractive index of 1.438 at 630 nm, a refractive index of 1.425 at 1554 nm, and a root mean squared roughness of less than 1 nm (measured over an area of 25 μm×25 μm). The coating was then heated in air at 550° C. for 2 h. No cracks were observed in the coating after the final heat treatment.

That which is claimed is:

1. A silicone resin having the formula: $[O_{(3-a)/2}R^1{}_aSi-SiR^1{}_bO_{(3-b)/2}]_v(R^1{}_3SiO_{1/2})_w(R^1{}_2SiO_{2/2})_x(R^1SiO_{3/2})_y(SiO_{4/2})_z$, wherein each $R^1$ is independently —H, hydrocarbyl, or substituted hydrocarbyl; a is 0, 1, or 2; b is 0, 1, 2 or 3; $0.01 \leq v < 0.3$, w is from 0 to 0.8; x is 0; y is from 0.1 to 0.8; z is from 0 to 0.99; and v+w+x+y+z=1, wherein the resin contains from 5 to 50% (w/w) of silicon-bonded hydroxy groups.

2. The silicone resin according to claim 1, wherein v has a value of from 0.1 to 0.25.

3. The silicone resin according to claim 1, wherein the resin has a number-average molecular weight of from 500 to 150,000.

4. A silicone resin having the formula $[O_{(3-a)/2}R^1{}_aSi-SiR^1{}_bO_{(3-b)/2}]_{v'}(R^1{}_3SiO_{1/2})_{w'}(R^1{}_2SiO_{2/2})_{x'}(R^1SiO_{3/2})_{y'}(SiO_{4/2})_{z'}$, wherein each $R^1$ is independently —H, hydrocarbyl, or substituted hydrocarbyl; a is 0, 1, or 2; b is 0, 1, 2 or 3; $0.7 < v' \leq 1.0$, w' is from 0 to 0.3; x' is 0; y' is from 0 to 0.3; z' is from 0 to 0.3; and v'+w'+x'+y'+z'=1.

5. The silicone resin according to claim 4, wherein the resin has a number-average molecular weight of from 500 to 150,000.

6. The silicone resin according to claim 4, wherein the resin contains from 5 to 50% (w/w) of silicon-bonded hydroxy groups.

7. A silicone resin having the formula $[O_{(3-a)/2}R^1{}_aSi-SiR^1{}_bO_{(3-b)/2}]_{v'}(R^1{}_3SiO_{1/2})_{w'}(R^1{}_2SiO_{2/2})_{x'}(R^1SiO_{3/2})_{y'}(SiO_{4/2})_{z'}$, wherein each $R^1$ is independently —H, hydrocarbyl, or substituted hydrocarbyl; a is 0, 1, or 2; b is 0, 1, 2 or 3, w' is from 0 to 0.3; x' is from 0 to 0.3; y' is from 0 to 0.3; z' is from 0 to 0.3; and v'+w'+x'+y'+z'=1, wherein v' has a value of from 0.75 to 0.9.

8. The silicone resin according to claim 7, wherein v' has a value of from 0.8 to 0.9.

9. The silicone resin according to claim 7, wherein the resin has a number-average molecular weight of from 500 to 150,000.

10. The silicone resin according to claim 7, wherein the resin contains from 5 to 50% (w/w) of silicon-bonded hydroxy groups.

11. A silicone composition comprising:
(A) a silicone resin selected from (i) at least one silicone resin having the formula $[O_{(3-a)/2}R^1{}_aSi-SiR^1{}_bO_{(3-b)/2}]_v(R^1{}_3SiO_{1/2})_w(R^1{}_2SiO_{2/2})_x(R^1SiO_{3/2})_y(SiO_{4/2})_z$, (ii) at least one silicone resin having the formula $[O_{(3-a)/2}R^1{}_aSi-SiR^1{}_bO_{(3-b)/2}]_{v'}(R^1{}_3SiO_{1/2})_{w'}(R^1{}_2SiO_{2/2})_{x'}(R^1SiO_{3/2})_{y'}(SiO_{4/2})_{z'}$, and (iii) a mixture comprising (i) and (ii), wherein each $R^1$ is independently —H, hydrocarbyl, or substituted hydrocarbyl; a is 0, 1, or 2; b is 0, 1, 2 or 3; $0.01 \leq v < 0.3$, w is from 0 to 0.8; x is 0; y is from 0.1 to 0.8; z is from 0 to 0.99; and v+w+x+y+z=1, $0.7 < v' \leq 1.0$, w' is from 0 to 0.3; x' is 0; y' is from 0 to 0.3; z' is from 0 to 0.3; and v'+w'+x'+y'+z'=1; and
(B) an organic solvent,
wherein when the silicone resin includes (i) at least one silicone resin having the formula $[O_{(3-a)/2}R^1{}_aSi-SiR^1{}_bO_{(3-b)/2}]_v(R^1{}_3SiO_{1/2})_w(R^1{}_2SiO_{2/2})_x(R^1SiO_{3/2})_y(SiO_{4/2})_z$, the resin contains from 5 to 50% (w/w) of silicon-bonded hydroxy groups.

12. The silicone composition according to claim 11, further comprising at least one of a cross-linking agent and a condensation catalyst.

13. A coated substrate comprising:
a substrate; and
a coating on the substrate, wherein the coating is a cured product or an oxidized product of a silicone resin selected from (i) at least one silicone resin having the formula $[O_{(3-a)/2}R^1{}_aSi-SiR^1{}_bO_{(3-b)/2}]_v(R^1{}_3SiO_{1/2})_w(R^1{}_2SiO_{2/2})_x(R^1SiO_{3/2})_y(SiO_{4/2})_z$, (ii) at least one silicone resin having the formula $[O_{(3-a)/2}R^1{}_aSi-SiR^1{}_bO_{(3-b)/2}]_{v'}(R^1{}_3SiO_{1/2})_{w'}(R^1{}_2SiO_{2/2})_{x'}(R^1SiO_{3/2})_{y'}(SiO_{4/2})_{z'}$, and (iii) a mixture comprising (i) and (ii), wherein each $R^1$ is independently —H, hydrocarbyl, or substituted hydrocarbyl; a is 0, 1, or 2; b is 0, 1, 2 or 3; $0.01 \leq v < 0.3$, w is from 0 to 0.8; x is 0; y is from 0.1 to 0.8; z is from 0 to 0.99; and v+w+x+y+z=1, $0.7 < v' \leq 1.0$, w' is from 0 to 0.3; x' is 0; y' is from 0 to 0.3; z' is from 0 to 0.3; and v'+w'+x'+y'+z'=1,
wherein when the silicone resin includes (i) at least one silicone resin having the formula $[O_{(3-a)/2}R^1{}_aSi-SiR^1{}_bO_{(3-b)/2}]_v(R^1{}_3SiO_{1/2})_w(R^1{}_2SiO_{2/2})_x(R^1SiO_{3/2})_y$ ($SiO_{4/2}$)$_z$, the resin contains from 5 to 50% (w/w) of silicon-bonded hydroxy groups.

14. The coated substrate according to claim 13, wherein the coating has a thickness of from 0.01 to 20 μm.

15. A silicone composition comprising:
(A) a silicone resin selected from (i) at least one silicone resin having the formula [$O_{(3-a)/2}R^1{}_aSi$—$SiR^1{}_bO_{(3-b)/2}$]$_v$($R^1{}_3SiO_{1/2}$)$_w$($R^1{}_2SiO_{2/2}$)$_x$($R^1SiO_{3/2}$)$_y$($SiO_{4/2}$)$_z$, (ii) at least one silicone resin having the formula [$O_{(3-a)/2}R^1{}_aSi$—$SiR^1{}_bO_{(3-b)/2}$]$_{v'}$($R^1{}_3SiO_{1/2}$)$_{w'}$($R^1{}_2SiO_{2/2}$)$_{x'}$($R^1SiO_{3/2}$)$_{y'}$($SiO_{4/2}$)$_{z'}$, and (iii) a mixture comprising (i) and (ii), wherein each $R^1$ is independently —H, hydrocarbyl, or substituted hydrocarbyl; a is 0, 1, or 2; b is 0, 1, 2 or 3; 0.01≤v<0.3, w is from 0 to 0.8; x is 0; y is from 0.1 to 0.8; z is from 0 to 0.99; and v+w+x+y+z=1, w' is from 0 to 0.3; x' is from 0 to 0.3; y' is from 0 to 0.3; z' is from 0 to 0.3; and v'+w'+x'+y'+z'=1, wherein v' has a value of from 0.75 to 0.9; and
(B) an organic solvent,
wherein when the silicone resin includes (i) at least one silicone resin having the formula [$O_{(3-a)/2}R^1{}_aSi$—$SiR^1{}_bO_{(3-b)/2}$]$_v$($R^1{}_3SiO_{1/2}$)$_w$($R^1{}_2SiO_{2/2}$)$_x$($R^1SiO_{3/2}$)$_y$($SiO_{4/2}$)$_z$, the resin contains from 5 to 50% (w/w) of silicon-bonded hydroxy groups.

16. The silicone composition according to claim 15, wherein v' has a value of from 0.8 to 0.9.

17. The silicone composition according to claim 15, further comprising at least one of a cross-linking agent and a condensation catalyst.

18. A coated substrate comprising:
a substrate; and
a coating on the substrate, wherein the coating is a cured product or an oxidized product of a silicone resin selected from (i) at least one silicone resin having the formula [$O_{(3-a)/2}R^1{}_aSi$—$SiR^1{}_bO_{(3-b)/2}$]$_v$($R^1{}_3SiO_{1/2}$)$_w$($R^1{}_2SiO_{2/2}$)$_x$($R^1SiO_{3/2}$)$_y$($SiO_{4/2}$)$_z$, (ii) at least one silicone resin having the formula [$O_{(3-a)/2}R^1{}_aSi$—$SiR^1{}_bO_{(3-b)/2}$]$_{v'}$($R^1{}_3SiO_{1/2}$)$_{w'}$($R^1{}_2SiO_{2/2}$)$_{x'}$($R^1SiO_{3/2}$)$_{y'}$($SiO_{4/2}$)$_{z'}$, and (iii) a mixture comprising (i) and (ii), wherein each $R^1$ is independently —H, hydrocarbyl, or substituted hydrocarbyl; a is 0, 1, or 2; b is 0, 1, 2 or 3; 0.01≤v<0.3, w is from 0 to 0.8; x is 0; y is from 0.1 to 0.8; z is from 0 to 0.99; and v+w+x+y+z=1, w' is from 0 to 0.3; x' is from 0 to 0.3; y' is from 0 to 0.3; z' is from 0 to 0.3; and v'+w'+x'+y'+z'=1, wherein v' has a value of from 0.75 to 0.9,
wherein when the silicone resin includes (i) at least one silicone resin having the formula [$O_{(3-a)/2}R^1{}_aSi$—$SiR^1{}_bO_{(3-b)/2}$]$_v$($R^1{}_3SiO_{1/2}$)$_w$($R^1{}_2SiO_{2/2}$)$_x$($R^1SiO_{3/2}$)$_y$($SiO_{4/2}$)$_z$, the resin contains from 5 to 50% (w/w) of silicon-bonded hydroxy groups.

19. The coated substrate according to claim 18, wherein v' has a value of from 0.8 to 0.9.

20. The coated substrate according to claim 18, wherein the coating has a thickness of from 0.01 to 20 μm.

* * * * *